United States Patent
Tsai et al.

(10) Patent No.: US 11,490,428 B2
(45) Date of Patent: Nov. 1, 2022

(54) INITIAL ACCESS IN NEW RADIO UNLICENSED SPECTRUM

(71) Applicant: MediaTek Inc., Hsinchu (TW)

(72) Inventors: Chiou-Wei Tsai, Hsinchu (TW); Jiann-Ching Guey, Hsinchu (TW); Chun-Hsuan Kuo, San Jose, CA (US)

(73) Assignee: MediaTek Inc.

( * ) Notice: Subject to any disclaimer, the term of this patent is extended or adjusted under 35 U.S.C. 154(b) by 0 days.

(21) Appl. No.: 16/368,853

(22) Filed: Mar. 29, 2019

(65) Prior Publication Data

US 2019/0313449 A1 Oct. 10, 2019

Related U.S. Application Data

(60) Provisional application No. 62/654,276, filed on Apr. 6, 2018.

(51) Int. Cl.
| | |
|---|---|
| *H04W 74/08* | (2009.01) |
| *H04L 5/00* | (2006.01) |
| *H04W 72/12* | (2009.01) |
| *H04W 74/00* | (2009.01) |

(52) U.S. Cl.
CPC ......... *H04W 74/085* (2013.01); *H04L 5/0053* (2013.01); *H04W 72/1242* (2013.01); *H04W 72/1268* (2013.01); *H04W 74/006* (2013.01)

(58) Field of Classification Search
CPC ........... H04W 74/085; H04W 72/1242; H04W 74/006; H04L 5/0053
See application file for complete search history.

(56) References Cited

U.S. PATENT DOCUMENTS

| | | | |
|---|---|---|---|
| 2017/0150523 A1* | 5/2017 | Patel | H04B 7/26 |
| 2017/0273056 A1* | 9/2017 | Papasakellariou | H04W 52/325 |
| 2019/0037481 A1* | 1/2019 | Zhang | H04L 5/0032 |
| 2019/0053176 A1 | 2/2019 | Lee et al. | |
| 2019/0053177 A1 | 2/2019 | Niu et al. | |
| 2019/0132882 A1* | 5/2019 | Li | H04L 27/2605 |

(Continued)

FOREIGN PATENT DOCUMENTS

| | | |
|---|---|---|
| CN | 107800523 A | 3/2018 |
| WO | WO 2018064279 A1 | 4/2018 |
| WO | WO 2018064372 A1 | 4/2018 |

OTHER PUBLICATIONS

China Natinoal Intellectual Property Administration, International Search Report and Written Opinion for International Patent Application No. PCT/CN2019/081216, dated Jun. 28, 2019.

(Continued)

*Primary Examiner* — Ayanah S George
(74) *Attorney, Agent, or Firm* — Han IP PLLC; Andy M. Han

(57) ABSTRACT

Techniques and examples of design for initial access in New Radio (NR) unlicensed spectrum (NR-U) are described. An apparatus receives from a base station of a wireless network which transmits one or multiple synchronization signal and PBCH blocks (SS/PBCH blocks) whose indices are indicated in a cyclic-wrapped order subject to a result of listen-before-talk (LBT) in NR-U. The apparatus also transmits a random access request on random access channel (RACH) resources allocated by the base station.

17 Claims, 4 Drawing Sheets

(56) References Cited

U.S. PATENT DOCUMENTS

2019/0380154 A1\* 12/2019 Wei .................. H04W 74/0833
2020/0022067 A1\*  1/2020 Pan ...................... H04W 8/005
2020/0359426 A1\* 11/2020 Pan .................. H04W 74/0808

OTHER PUBLICATIONS

Nokia et al., Potential solutions and techniques for NR unlicensed, 3GPP TSG RAN WG1 Meeting #92, R1-1802526, Athens, Greece, Feb. 26-Mar. 2, 2018.
Taiwan Intellectual Propertyoffice, Office Action for Taiwan Patent Application No. 109104003, dated Aug. 24, 2020.

\* cited by examiner

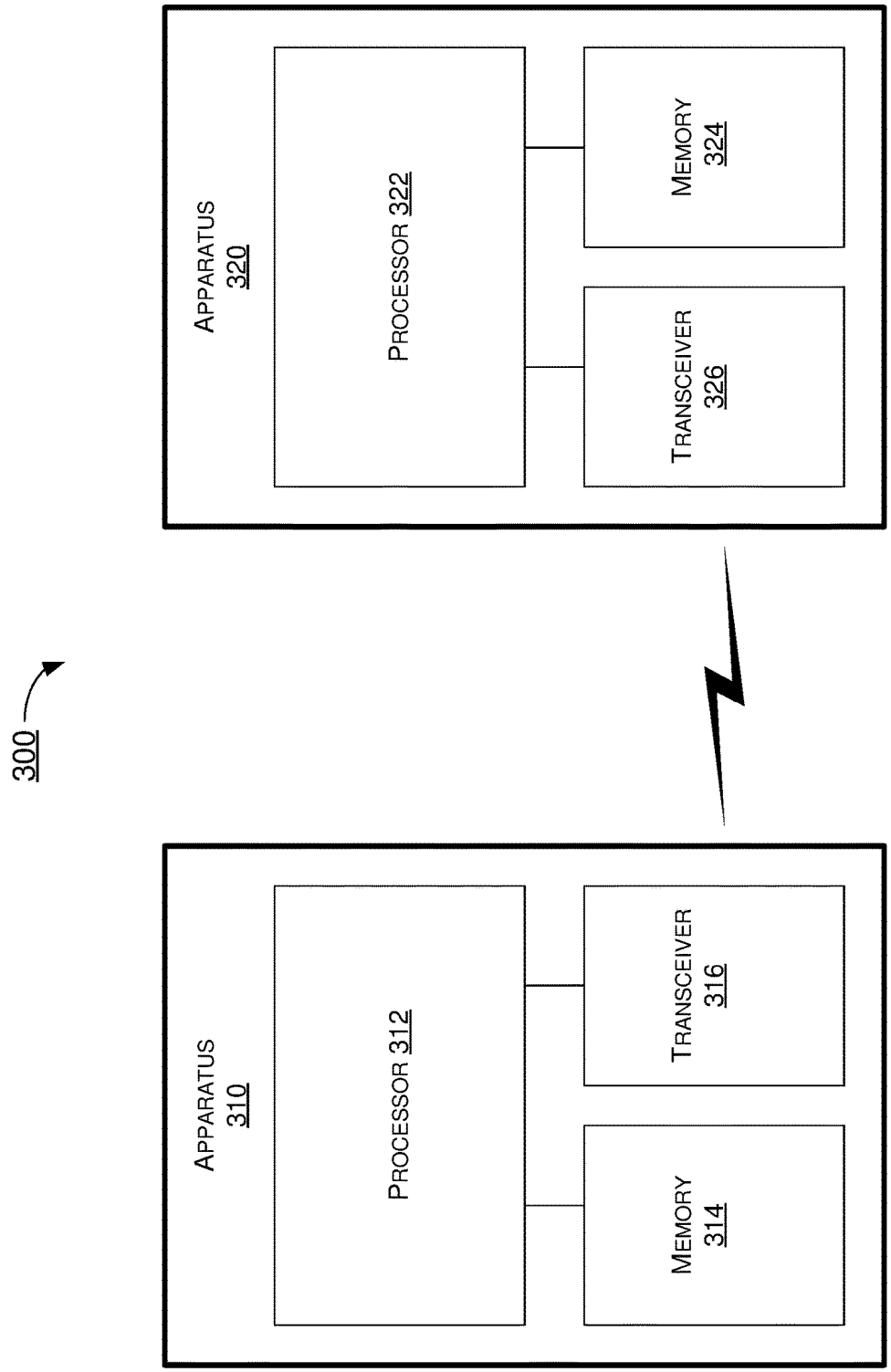

400

RECEIVE, BY A PROCESSOR OF AN APPARATUS, FROM A BASE STATION OF A WIRELESS NETWORK WHICH TRANSMITS ONE OR MULTIPLE SYNCHRONIZATION SIGNAL AND PBCH BLOCKS (SS/PBCH BLOCKS) WHOSE INDICES ARE INDICATED IN A CYCLIC-WRAPPED ORDER SUBJECT TO A RESULT OF LISTEN-BEFORE-TALK (LBT) IN A NEW RADIO UNLICENSED SPECTRUM (NR-U)
410

↓

TRANSMIT, BY THE PROCESSOR, A RANDOM ACCESS REQUEST ON RANDOM ACCESS CHANNEL (RACH) RESOURCES ALLOCATED BY THE BASE STATION
420

FIG. 4

INITIAL ACCESS IN NEW RADIO UNLICENSED SPECTRUM

CROSS REFERENCE TO RELATED PATENT APPLICATION

The present disclosure claims the priority benefit of U.S. Provisional Patent Application No. 62/654,276, filed on 6 Apr. 2018, the content of which is herein incorporated by reference in its entirety.

TECHNICAL FIELD

The present disclosure is generally related to mobile communications and, more particularly, to design for initial access in New Radio (NR) unlicensed spectrum (NR-U).

BACKGROUND

Unless otherwise indicated herein, approaches described in this section are not prior art to the claims listed below and are not admitted as prior art by inclusion in this section.

The study item of NR-based access to unlicensed spectrum has been approved by $3^{rd}$-Generation Partnership Project (3GPP). Besides NR-based license-assisted access by carrier aggregation (CA) or dual connectivity (DC), stand-alone (SA) operation of unlicensed spectrum is also in the scope of this study item. For fair coexistence with other networks operating in unlicensed spectrum, design for NR-U should take regulation into account to include features such as listen-before-talk (LBT) and minimum occupied channel bandwidth (OCB).

Due to LBT, the availability of channel access becomes unpredictable. It is hence of interest to reduce initial access latency in NR-U operation. Furthermore, how to support random access, especially contention-based random access channel (RACH), in the unlicensed spectrum needs to be addressed. Additionally, it is desirable if uplink control information (UCI) can be transmitted on unlicensed bands. Then, how to multiplex physical random access channel (PRACH) with physical uplink control channel (PUCCH) and physical uplink shared channel (PUSCH) also needs to be addressed. In particular, it is essential for NR-U stand-alone operation to send UCI on an unlicensed carrier. Even for license-assisted access, it would reduce the control signaling loading on the licensed carrier for the CA or DC cases.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus receiving from a base station of a wireless network which transmits one or multiple synchronization signal and PBCH blocks (SS/PBCH blocks) whose indices are indicated in a cyclic-wrapped order subject to a result of LBT in an NR-U. The method may also involve the processor transmitting a random access request on RACH resources allocated by the base station.

It is noteworthy that, although description provided herein may be in the context of certain radio access technologies, networks and network topologies such as 5G NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a block diagram of an example system in accordance with an implementation of the present disclosure.

FIG. 4 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
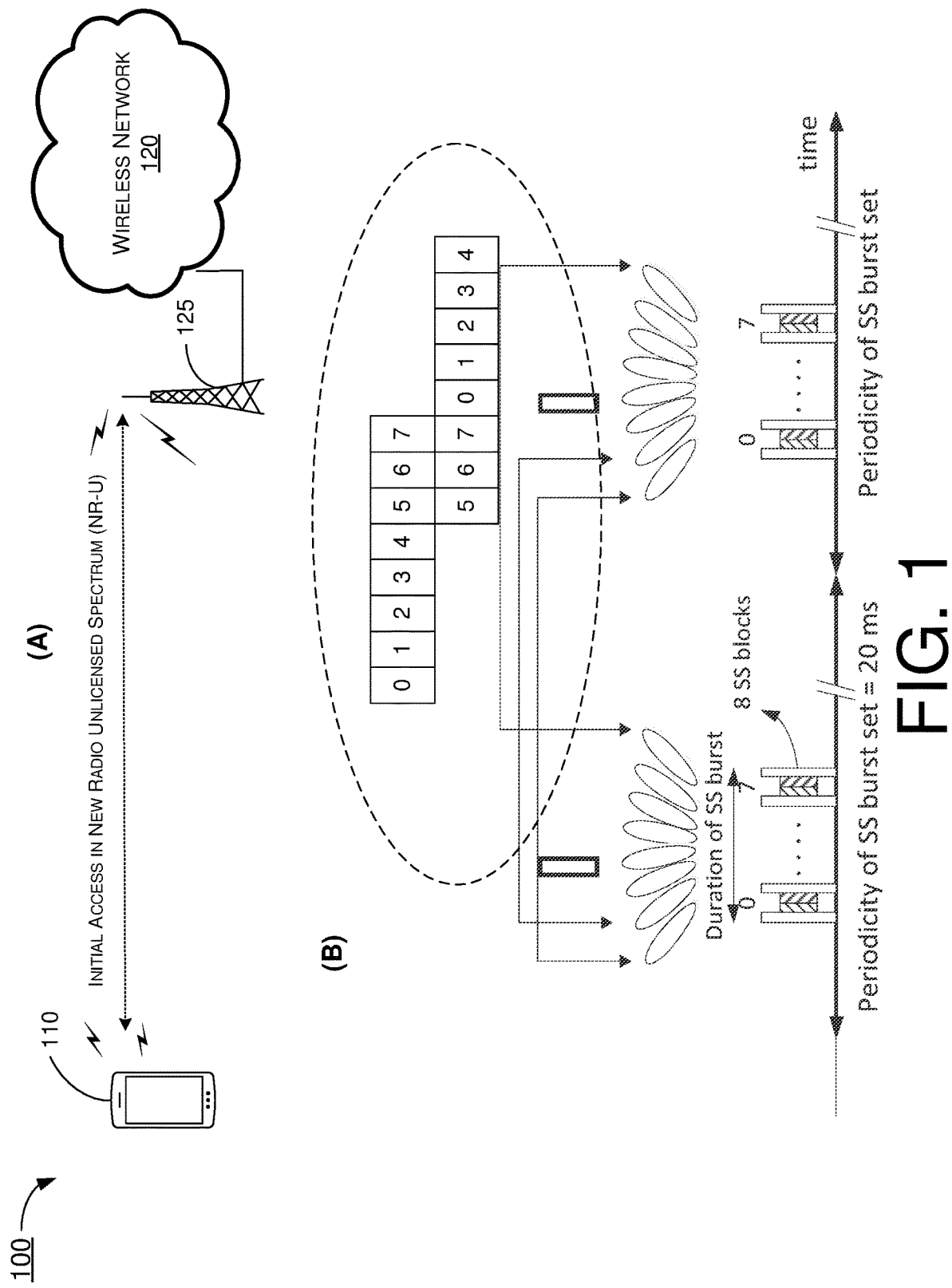
FIG. 1 is a diagram of an example scenario of timing configuration of initial access opportunities for initial access in NR-U in accordance with the present disclosure.

FIG. 1 illustrates an example scenario 100 of timing configuration of initial access opportunities for initial access in NR-U in accordance with the present disclosure. Referring to part (A) of FIG. 1, scenario 100 may involve a user equipment (UE) 110 in wireless communication with a wireless network 120 (e.g., a $5^{th}$-Generation (5G) NR mobile network) via a base station or network node 125 (e.g., a gNB or transmit-receive point (TRP)). In scenario 100, UE 110 may perform initial access in NR-U with wireless network 120 via network node 125 based on one or more of various proposed schemes in accordance with the present disclosure. The follow description of various solutions in accordance with the present disclosure is provided with reference to part (A) and part (B) of FIG. 1.

Referring to part (B) of FIG. 1, for NR licensed spectrum under a proposed scheme in accordance with the present disclosure, SSBs within each SS burst may be repeated every 20 milliseconds (ms). Additionally, each SSB may be identified by a respective time index within the corresponding SS burst. Moreover, SSBs with the same index in different SS bursts may have the same beamforming (e.g., transmitted using the same beamforming). In scenario 100, for NR-U under the proposed scheme, a time index may be kept in order for NR-U.

Under a proposed scheme in accordance with the present disclosure, additional opportunistic initial access opportunities (IAOPs) may be allowed in an event that pre-configured IAOPs cannot be transmitted due to LBT failure. Under the proposed scheme, the opportunistic IAOPs may follow periodic IAOPs by a predefined rule. For instance, the predefined rule may be that opportunistic IAOPs are immediately after the periodic IAOPs.

Under a proposed scheme in accordance with the present disclosure, with respect to RACH resource allocation, pre-configured RACH resources may immediately follow SSB(s) to relax UL LBT for Msg1 transmission. For single-beam transmissions, RACH resources may be allocated in ending symbols of a SSB/PBCH slot. For multi-beam transmissions, RACH resources may be allocated in a same slot as the corresponding SSB. Alternatively, RACH resources may be allocated in a fixed duration after a set of SS bursts (e.g., after each of the SS burst sets). Under the proposed scheme, opportunistic Msg1 transmission occasions may be allocated immediately follow SSB(s) (e.g., after each of the SS burst sets) in a subsequent slot, mini-slot or COT in an event that the periodic RACH resources are not available due to failure of LBT.

Under a proposed scheme in accordance with the present disclosure, to reduce initial access latency, synchronization signal (SS) burst sets may be repeatedly transmitted to assist UE 110 for its receive (RX) beam sweeping to accelerate downlink synchronization process in NR-U. Moreover, under the proposed scheme, RACH resources may be allocated by a rule relative to synchronization signal block (SSB) and physical broadcast channel (PBCH) transmissions as well as RACH. For instance, the rule may be predefined in the 3GPP specification or by wireless network 120 via broadcast signals. The rule may include, for example and without limitation: (1) allocating the RACH resources immediately following each of the SS burst sets (e.g., after a short inter-frame space (SIFS) following each SS burst set); and/or (2) allocating the RACH resources at end of a channel occupancy time (COT) as a SSB or PBCH transmission. In an event of LBT failure at predefined time instance(s) for SSB/PBCH transmission and RACH, additional opportunities may be allowed. For instance, multiple transmissions of a RACH preamble (Msg1) may be performed to accelerate uplink (UL) beam pair identification. This may be especially helpful for UE 110 without beam correspondence. With multiple Msg1 transmissions, UE 110 may transmit more than one Msg1 before the end of a random access response (RAR) window. Accordingly, UE 110 may attempt different transmit (TX) beams at each Msg1 transmission.

Under a proposed scheme in accordance with the present disclosure, with respect to RACH design for unlicensed band operation, a UE may transmit PRACH by at least one of multiple methods. In a first method under the proposed scheme, UE 110 may transmit PRACH on predefined RACH resources which are allocated by a rule. The rule may be predefined in the 3GPP specification, by wireless network 120 via broadcast signals and/or by UE-specific signaling. The rule may include, for example and without limitation: (1) allocating RACH resources immediately following each of the SS burst sets (e.g., after a SIFS following each SS burst set) or each transmission of remaining minimum system information (RMSI); (2) allocating RACH resources at the end of a COT as a SSB/PBCH transmission; (3) allocating RACH resources at the end of a COT as an RMSI transmission; and/or (4) allocating RACH resources immediately following a downlink (DL) transmission. It is believed that, with the first method, UE 110 may take advantage of reduced LBT time for Msg1 transmission and/or UE 110 may reduce the time of reading system information carried by RMSI.

In a second method under the proposed scheme, which may be considered as an autonomous PRACH method, UE 110 may transmit PRACH whenever a communication channel is cleared for transmission. It is believed that this may reduce or avoid the allocation of time and/or frequency dedicated for PRACH transmissions. A base station of wireless network 120 may need to continuously detect the RACH preamble transmitted by UE 110.

In a third method under the proposed scheme, UE 110 may transmit PRACH on pre-configured resources that are shared with other UL channels and/or signals. In an event that PRACH and PUCCH share the same time and/or frequency resources, the PRACH and PUCCH may be multiplexed in the code domain (e.g., by different preambles). Moreover, prioritization may be achieved by assigning different starting positions, different channel access priority levels and/or different LBT durations.

Under a proposed scheme in accordance with the present disclosure, with respect to RACH design for unlicensed band operation, one or more operations may be performed in an event that a simplified two-step RACH procedure is considered in which UE 110 transmits some data in the first step. For instance, UE 110 may transmit data containing information such as identify of UE 110. Additionally, or alternatively, the data may be transmitted in time and/or frequency resources that are shared with PUSCH for other purposes. That is, the data may be multiplexed in the code domain (e.g., by different demodulation reference signals (DMRS's)). Moreover, prioritization may be achieved by assigning different starting positions, different channel access priority levels and/or different LBT durations.

Under a proposed scheme in accordance with the present disclosure, UE 110 may transmit autonomous PUCCH whenever the channel is cleared. Purposes of the PUCCH transmission may include, for example and without limitation, scheduling request (SR) and/or acknowledgement (ACK) and negative acknowledgement (NACK). Additionally, the autonomous PUCCH transmission may be either contention-free or contention-based. Under the proposed scheme, autonomous PUCCH may be transmitted on pre-configured time and/or frequency resources which are defined by a rule. The rule may be predefined in the 3GPP specification, by wireless network 120 via broadcast signals and/or by UE-specific signaling. The rule may include, for example and without limitation: (1) UE 110 transmitting autonomous PUCCH immediately following an original scheduled resource; and/or (2) allocating autonomous PUCCH transmission resources at the end of a slot, a mini-slot or a COT. In an event that ACK/NACK cannot be transmitted in the scheduled resource(s) due to LBT failure, UE 110 may be allowed to transmit ACK/NACK in a pre-allocated resource in an autonomous manner.

Under a proposed scheme in accordance with the present disclosure, UE 110 may learn whether pre-configured resources are available or not for autonomous transmission. For instance, UE 110 may learn such information by dynamic indication transmitted by wireless network 120 beforehand. Additionally, or alternatively, UE 110 may learn such information by the result of LBT. That is, in an event that wireless network 120 intends to prioritize scheduled transmission(s) over autonomous transmission(s), wireless network 120 may assign different starting positions, different channel access priority levels and/or different LBT durations.

Under a proposed scheme in accordance with the present disclosure, UE 110 may perform one or more operations in an event that two physical channels or signals for different purposes share the same time and/or frequency resources. For instance, the two physical channels may be multiplexed in the code domain (e.g., by different preambles). Moreover, prioritization may be achieved by assigning different starting positions, different channel access priority levels and/or different LBT durations. The multiplexed channels may include, for example and without limitation: (1) PRACH and PUCCH; and/or (2) data transmission in the first step of two-step RACH procedure and PUSCH transmission(s) for other purposes.

Figure 2:
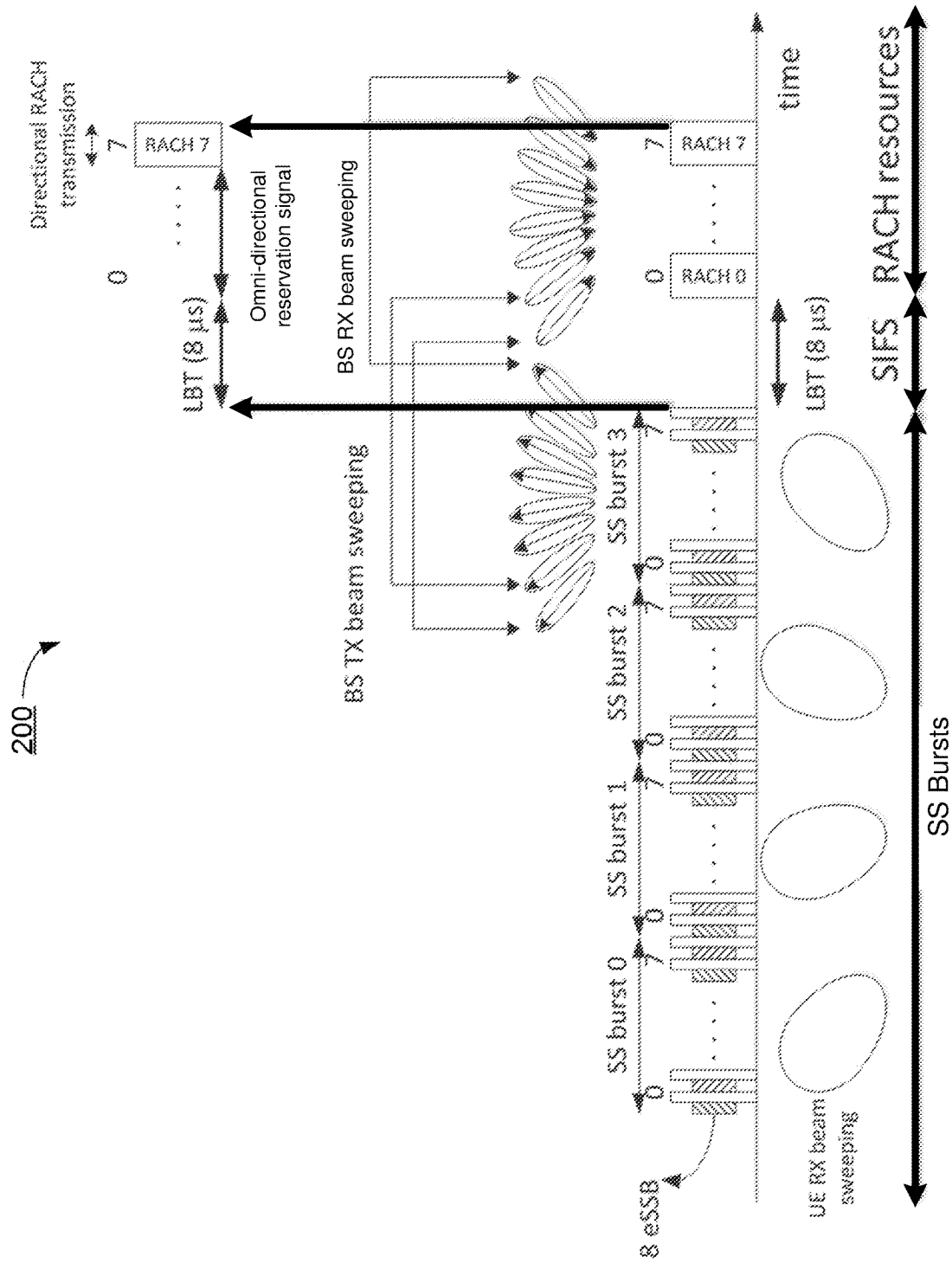
FIG. 2 is a diagram of an example scenario of initial access in NR-U in accordance with the present disclosure.

FIG. 2 illustrates an example scenario 200 of timing configuration of initial access opportunities for initial access in NR-U in accordance with the present disclosure. In scenario 200, under a proposed scheme in accordance with the present disclosure, periodic IAOPs may be allocated for transmission of broadcast signals and to provide random access occasions. The broadcast signals may be SSB/PBCH, RMSI, paging and/or reference signals. The random access occasions may be for PRACH transmissions and/or data transmissions in the first step of the simplified two-step RACH procedure. Under the proposed scheme, periodic IAOPs may be configured in one or more ways. For instance, the location and/or time instances of periodic IAOPs may be predefined in the 3GPP specification. Alternatively, periodic IAOPs may be part of broadcast system information that is broadcasted by wireless network 120. Under the proposed scheme, transmissions during each IAOP may include, for example and without limitation, one or more SS bursts transmitted by wireless network 120, which may be followed by a short inter-frame space (SIFS), which may be followed by UL RACH resources.

Illustrative Implementations

FIG. 3 illustrates an example system 300 having at least an example apparatus 310 and an example apparatus 320 in accordance with an implementation of the present disclosure. Each of apparatus 310 and apparatus 320 may perform various functions to implement schemes, techniques, processes and methods described herein pertaining to design for initial access in NR-U, including the various schemes described above with respect to various proposed designs, concepts, schemes, systems and methods described above as well as process 300 described below. For instance, apparatus 310 may be an example implementation of UE 110, and apparatus 320 may be an example implementation of network node 125.

Each of apparatus 310 and apparatus 320 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 310 and apparatus 320 may be implemented in a smartphone, a smart watch, a personal digital assistant, a digital camera, or a computing equipment such as a tablet computer, a laptop computer or a notebook computer. Each of apparatus 310 and apparatus 320 may also be a part of a machine type apparatus, which may be an IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. When implemented in or as a network apparatus, apparatus 310 and/or apparatus 320 may be implemented in a network node (e.g., network node 125), such as an eNB in an LTE, LTE-Advanced or LTE-Advanced Pro network or in a gNB or TRP in a 5G network, an NR network or an IoT network.

In some implementations, each of apparatus 310 and apparatus 320 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 310 and apparatus 320 may be implemented in or as a network apparatus or a UE. Each of apparatus 310 and apparatus 320 may include at least some of those components shown in FIG. 3 such as a processor 312 and a processor 322, respectively, for example. Each of apparatus 310 and apparatus 320 may further include one or more other components not pertinent to the proposed scheme of the present disclosure (e.g., internal power supply, display device and/or user interface device), and, thus, such component(s) of apparatus 310 and apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including those pertaining to design for initial access in NR-U in accordance with various implementations of the present disclosure.

In some implementations, apparatus 310 may also include a transceiver 316 coupled to processor 312. Transceiver 316 may be capable of wirelessly transmitting and receiving data. In some implementations, apparatus 320 may also include a transceiver 326 coupled to processor 322. Transceiver 326 may include a transceiver capable of wirelessly transmitting and receiving data.

In some implementations, apparatus 310 may further include a memory 314 coupled to processor 312 and capable of being accessed by processor 312 and storing data therein. In some implementations, apparatus 320 may further include a memory 324 coupled to processor 322 and capable of being accessed by processor 322 and storing data therein. Each of memory 314 and memory 324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 314 and memory 324 may include a type of read-only memory (ROM) such as mask ROM, programmable ROM (PROM), erasable programmable ROM (EPROM) and/or electrically erasable programmable ROM (EEPROM). Alternatively, or additionally, each of memory 314 and memory 324 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 310 and apparatus 320 may be a communication entity capable of communicating with each other using various proposed schemes in accordance with the present disclosure. For illustrative purposes and without limitation, a description of capabilities of apparatus 310, as a UE, and apparatus 320, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 310 as a UE (e.g., UE 110), the same is also applicable to apparatus 320 as a network node or base station such as a gNB, TRP or eNodeB (e.g., network node 125) of a wireless network (e.g., wireless network 120) such as a 5G NR mobile network.

Under various proposed solutions in accordance with the present disclosure, processor 312 of apparatus 310 may reduce an amount of listen-before-talk (LBT) time or an impact of the LBT for initial access to apparatus 320 in a NR-U by receiving from apparatus 320 which transmits one or multiple synchronization signal and PBCH blocks (SS/PBCH blocks) whose indices may be indicated in a cyclic-wrapped order subject to a result of the LBT. Furthermore, processor 312 may transmit a random access request on RACH resources allocated by apparatus 320.

In some implementations, processor 312 may also sweep a receive (RX) beam of a receiver of transceiver 316 of apparatus 310 while repeated SS burst sets are transmitted by apparatus 320 in the NR-U.

In some implementations, the RACH resources may be allocated in the NR-U according to a rule. In some implementations, the rule may be a predefined rule, a rule received in a broadcast signal from apparatus 320, a user equipment (UE)-specific signal from apparatus 320, or any combination thereof. In some implementations, the rule may involve one of the following: (i) allocating the RACH resources after a short inter-frame space (SIFS) following each of the SS burst sets; (ii) allocating the RACH resources at end of a channel occupancy time (COT) as a SSB or PBCH transmission; (iii) allocating the RACH resources at end of the COT as a remaining minimum system information (RMSI) transmission; (iv) allocating the RACH resources immediately following a downlink transmission from the wireless network via apparatus 320; and (v) allocating the RACH resources dynamically by a PDCCH in a COT acquired by apparatus 320.

In some implementations, processor 312 may perform additional operations. For instance, processor 312 may perform, via transceiver 316, LBT in the NR-U for transmission of a RACH preamble (Msg1) on a PRACH. Additionally, processor 312 may perform, via transceiver 316, one or more multiple PRACH transmissions to the wireless network via apparatus 320 on one or multiple allocated RACH resources before end of a random access response (RAR) window of time. In some implementations, the one or multiple PRACH transmissions may be performed with same or different transmit (TX) beams.

In some implementations, in performing the PRACH transmissions, processor 312 may perform either of the following: (a) transmitting in the PRACH when a communication channel between apparatus 310 and the wireless network is clear for transmissions; and (b) transmitting in the PRACH on configured resources that are shared with one or more other uplink channels or one or more other signals. In some implementations, in transmitting in the PRACH on the configured resources that are shared, processor 312 may multiplex, via transceiver 316, the PRACH and a physical uplink control channel (PUCCH) in a code domain by different preambles. In some implementations, the PRACH and the PUCCH may share same resources in either or both time and frequency. In some implementations, in transmitting in the PRACH on the configured resources that are shared further, processor 312 may prioritize the PRACH and the PUCCH by performing at least one of the following: (i) assigning different starting positions for the PRACH and the PUCCH; (ii) assigning different channel access priority levels to the PRACH and the PUCCH; and (iii) assigning different LBT durations for the PRACH and the PUCCH.

In some implementations, processor 312 may perform other additional operations. For instance, processor 312 may perform, via transceiver 316, a two-step RACH procedure with the wireless network in the NR-U by transmitting data to via apparatus 320 in a first step of the two-step RACH procedure. In some implementations, the data may contain an identity of apparatus 310. In some implementations, in transmitting the data, processor 312 may transmit the data on resources that are shared with a physical uplink shared channel (PUSCH) that is for a different purpose. In some implementations, in transmitting the data on the resources that are shared with the PUSCH, processor 312 may multiplex, via transceiver 316, the data and the PUSCH in a code domain by different preambles. In some implementations, the data and the PUSCH may share same resources in either or both time and frequency. In some implementations, in transmitting the data on the resources that are shared with the PUSCH, processor 312 may prioritize the data and the PUSCH by performing at least one of the following: (i) assigning different starting positions for the data and the PUSCH; (ii) assigning different channel access priority levels to the data and the PUSCH; and (iii) assigning different LBT durations for the data and the PUSCH.

In some implementations, processor 312 may perform other additional operations. For instance, processor 312 may transmit, via transceiver 316, in a PUCCH in the NR-U to apparatus 320 on a contention-based or contention-free basis when a communication channel between apparatus 310 and the wireless network is clear for transmissions. In some implementations, in transmitting in the PUCCH, processor 312 may perform either of the following: (a) transmitting in the PUCCH a scheduling request (SR), an acknowledgement (ACK), a negative acknowledgement (NACK), or a combination thereof; and (b) transmitting in the PUCCH on configured resources that are defined according to a rule. In some implementations, the rule may be predefined in a specification or received in a broadcast signal or signaling specific for apparatus 310 from the wireless network via apparatus 320. In some implementations, the rule may involve either of the following: (i) transmitting in the PUCCH immediately following an originally scheduled resource; or (ii) allocating the configured resources at end of a slot, a mini-slot, or a COT. In some implementations, in transmitting in the PUCCH on the configured resources, processor 312 may determine whether the configured resources are available for autonomous transmissions by either of the following: (a) receiving an indication from the wireless network via apparatus 320 before the transmitting in the PUCCH; and (b) performing LBT.

In some implementations, processor 312 may perform other additional operations. For instance, processor 312 may transmit, via transceiver 316, in two physical channels or signals for different purposes in the NR-U that share same resources in time or frequency. In some implementations, in transmitting in the two physical channels or signals, processor 312 may multiplex, via transceiver 316, the two physical channels or signals in a code domain by different preambles. In some implementations, in transmitting in the two physical channels or signals, processor 312 may prioritize the two physical channels or signals by performing at least one of the following: (i) assigning different starting positions for the two physical channels or signals; (ii) assigning different channel access priority levels to the two physical channels or signals; and (iii) assigning different LBT durations for the two physical channels or signals.

In some implementations, the RACH resources may include pre-configured RACH resources allocated after a SIFS following each of the SS burst sets to relax uplink LBT for PRACH transmission. In some implementations, for single-beam transmissions, the RACH resources may be allocated in ending symbols of a slot for SSB or PBCH. In some implementations, for multi-beam transmissions, the RACH resources may be allocated either in a same slot as a corresponding SSB or in a fixed duration after each of the SS burst sets.

In some implementations, in receiving from apparatus 320 which transmits one or multiple SS/PBCH blocks, processor 312 may allocate opportunistic SS/PBCH block transmission opportunities responsive to pre-configured periodic SS/PBCH block transmission opportunities being not available due to failure of LBT.

Illustrative Processes

FIG. 4 illustrates an example process 400 in accordance with an implementation of the present disclosure. Process 400 may represent an aspect of implementing various proposed designs, concepts, schemes, systems and methods described above. More specifically, process 400 may represent an aspect of the proposed concepts and schemes pertaining to design for initial access in NR-U. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/ sub-blocks of process 400 may be executed repeatedly or iteratively. Process 400 may be implemented by or in apparatus 310 and apparatus 320 as well as any variations thereof. Solely for illustrative purposes and without limiting the scope, process 400 is described below in the context of apparatus 310 as a UE (e.g., UE 110) and apparatus 320 as a network node (e.g., network node 125) of a wireless network (e.g., wireless network 120) such as a 4G/NR mobile network. Process 400 may begin at block 410.

At 410, process 400 may involve processor 312 of apparatus 310 receiving from apparatus 320 which transmits one or multiple synchronization signal and PBCH blocks (SS/PBCH blocks) whose indices are indicated in a cyclic-wrapped order subject to a result of listen-before-talk (LBT) in an NR-U. Process 400 may proceed from 410 to 420.

At 420, process 400 may involve processor 312 transmitting a random access request on RACH resources allocated by apparatus 320.

In some implementations, process 400 may further involve processor 312 sweeping a receive (RX) beam of a receiver of transceiver 316 of apparatus 310 while repeated SS burst sets are transmitted by apparatus 320 in the NR-U.

In some implementations, the RACH resources may be allocated in the NR-U according to a rule. In some implementations, the rule may be a predefined rule, a rule received in a broadcast signal from the wireless network via apparatus 320, a UE-specific signal from apparatus 320, or any combination thereof. In some implementations, the rule may involve one of the following: (i) allocating the RACH resources after a short inter-frame space (SIFS) following each of the SS burst sets; (ii) allocating the RACH resources at end of a channel occupancy time (COT) as a SSB or PBCH transmission; (iii) allocating the RACH resources at end of the COT as a remaining minimum system information (RMSI) transmission; (iv) allocating the RACH resources immediately following a downlink transmission from the wireless network via apparatus 320; and (v) allocating the RACH resources dynamically by a PDCCH in a COT acquired by apparatus 320.

In some implementations, process 400 may involve processor 312 performing additional operations. For instance, process 400 may involve processor 312 performing, via transceiver 316, LBT in the NR-U for transmission of a RACH preamble (Msg1) on a PRACH. Additionally, process 400 may involve processor 312 performing, via transceiver 316, one or multiple PRACH transmissions to the wireless network via apparatus 320 on one or multiple allocated RACH resources before end of a random access response (RAR) window of time. In some implementations, the one or multiple PRACH transmissions may be performed with same or different transmit (TX) beams.

In some implementations, in performing the PRACH transmissions, process 400 may involve processor 312 performing either of the following: (a) transmitting in the PRACH when a communication channel between apparatus 310 and the wireless network is clear for transmissions; and (b) transmitting in the PRACH on configured resources that are shared with one or more other uplink channels or one or more other signals. In some implementations, in transmitting in the PRACH on the configured resources that are shared, process 400 may involve processor 312 multiplexing, via transceiver 316, the PRACH and a physical uplink control channel (PUCCH) in a code domain by different preambles. In some implementations, the PRACH and the PUCCH may share same resources in either or both time and frequency. In some implementations, in transmitting in the PRACH on the configured resources that are shared further, process 400 may involve processor 312 prioritizing the PRACH and the PUCCH by performing at least one of the following: (i) assigning different starting positions for the PRACH and the PUCCH; (ii) assigning different channel access priority levels to the PRACH and the PUCCH; and (iii) assigning different LBT durations for the PRACH and the PUCCH.

In some implementations, process 400 may involve processor 312 performing additional operations. For instance, process 400 may involve processor 312 performing, via transceiver 316, a two-step RACH procedure with the wireless network in the NR-U by transmitting data to via apparatus 320 in a first step of the two-step RACH procedure. In some implementations, the data may contain an identity of apparatus 310. In some implementations, in transmitting the data, process 400 may involve processor 312 transmitting the data on resources that are shared with a physical uplink shared channel (PUSCH) that is for a different purpose. In some implementations, in transmitting the data on the resources that are shared with the PUSCH, process 400 may involve processor 312 multiplexing, via transceiver 316, the data and the PUSCH in a code domain by different preambles. In some implementations, the data and the PUSCH may share same resources in either or both time and frequency. In some implementations, in transmitting the data on the resources that are shared with the PUSCH, process 400 may also involve processor 312 prioritizing the data and the PUSCH by performing at least one of the following: (i) assigning different starting positions for the data and the PUSCH; (ii) assigning different channel access priority levels to the data and the PUSCH; and (iii) assigning different LBT durations for the data and the PUSCH.

In some implementations, process 400 may involve processor 312 performing additional operations. For instance, process 400 may involve processor 312 transmitting, via transceiver 316, in a PUCCH in the NR-U to apparatus 320 on a contention-based or contention-free basis when a communication channel between apparatus 310 and the wireless network is clear for transmissions. In some implementations, in transmitting in the PUCCH, process 400 may involve processor 312 performing either of the following: (a) transmitting in the PUCCH a scheduling request (SR), an acknowledgement (ACK), a negative acknowledgement (NACK), or a combination thereof; and (b) transmitting in the PUCCH on configured resources that are defined according to a rule. In some implementations, the rule may be predefined in a specification or received in a broadcast signal or signaling specific for apparatus 310 from the wireless network via apparatus 320. In some implementations, the rule may involve either of the following: (i) transmitting in the PUCCH immediately following an originally scheduled resource; or (ii) allocating the configured resources at end of a slot, a mini-slot, or a COT. In some implementations, in transmitting in the PUCCH on the configured resources, process 400 may involve processor 312 determining whether the configured resources are available for autonomous transmissions by either of the following: (a) receiving an indication from the wireless network via apparatus 320 before the transmitting in the PUCCH; and (b) performing LBT.

In some implementations, process 400 may involve processor 312 performing additional operations. For instance, process 400 may involve processor 312 transmitting, via transceiver 316, in two physical channels or signals for different purposes in the NR-U that share same resources in time or frequency. In some implementations, in transmitting in the two physical channels or signals, process 400 may involve processor 312 multiplexing, via transceiver 316, the two physical channels or signals in a code domain by different preambles. In some implementations, in transmitting in the two physical channels or signals, process 400 may further involve processor 312 prioritizing the two physical channels or signals by performing at least one of the following: (i) assigning different starting positions for the two physical channels or signals; (ii) assigning different channel access priority levels to the two physical channels or signals; and (iii) assigning different LBT durations for the two physical channels or signals.

In some implementations, the RACH resources may include pre-configured RACH resources allocated after a SIFS following each of the SS burst sets to relax uplink LBT for PRACH transmission. In some implementations, for single-beam transmissions, the RACH resources may be allocated in ending symbols of a slot for SSB or PBCH. In some implementations, for multi-beam transmissions, the RACH resources may be allocated either in a same slot as a corresponding SSB or in a fixed duration after each of the SS burst sets.

In some implementations, in receiving from apparatus 320 which transmits one or multiple SS/PBCH blocks, process 400 may involve processor 312 allocating opportunistic SS/PBCH block transmission opportunities responsive to pre-configured periodic SS/PBCH block transmission opportunities being not available due to failure of LBT.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, from a base station of a wireless network one or multiple burst sets of synchronization signal and physical broadcast channel (PBCH) blocks (SS/PBCH blocks) whose indices are indicated in a cyclic-wrapped order subject to a result of listen-before-talk (LBT) in a New Radio unlicensed spectrum (NR-U);
   transmitting, by the processor, a random access request on random access channel (RACH) resources allocated by the base station;
   performing, by the processor, LBT in the NR-U for transmission of a RACH preamble (Msg1) on a physical random access channel (PRACH); and
   performing, by the processor, multiple PRACH transmissions of the Msg1, which are not retransmissions, to the wireless network on multiple of the allocated RACH resources before end of a random access response (RAR) window of time,
   wherein the multiple PRACH transmissions are performed with same or different transmit (TX) beams,
   wherein the performing of the multiple PRACH transmissions comprises transmitting in the PRACH on configured resources that are shared with one or more other uplink channels or one or more other signals, and
   wherein the transmitting in the PRACH on the configured resources that are shared comprises multiplexing the PRACH and a physical uplink control channel (PUCCH) by performing some or all of:
      assigning different starting positions for the PRACH and the PUCCH;
      assigning different channel access priority levels to the PRACH and the PUCCH; and
      assigning different LBT durations for the PRACH and the PUCCH.

2. The method of claim 1, further comprising:
   sweeping, by the processor, a receive (RX) beam of a receiver of the apparatus while repeated SS burst sets are transmitted by the base station in the NR-U.

3. A method comprising:
   receiving, by a processor of an apparatus, from a base station of a wireless network one or multiple burst sets of synchronization signal and physical broadcast channel (PBCH) blocks (SS/PBCH blocks) whose indices are indicated in a cyclic-wrapped order subject to a result of listen-before-talk (LBT) in a New Radio unlicensed spectrum (NR-U);
   transmitting, by the processor, a random access request on random access channel (RACH) resources allocated by the base station;
   performing, by the processor, LBT in the NR-U for transmission of a RACH preamble (Msg1) on a physical random access channel (PRACH); and
   performing, by the processor, multiple PRACH transmissions of the Msg1, which are not retransmissions, to the wireless network on multiple of the allocated RACH resources before end of a random access response (RAR) window of time,
   wherein the multiple PRACH transmissions are performed with same or different transmit (TX) beams,
   wherein the RACH resources are allocated in the NR-U according to a rule that involves two or more of:
      allocating the RACH resources after a short inter-frame space (SIFS) following each of the SS burst sets;
      allocating the RACH resources at end of a channel occupancy time (COT) as a SSB or PBCH transmission;
      allocating the RACH resources at end of the COT as a remaining minimum system information (RMSI) transmission; and
      allocating the RACH resources immediately following a downlink transmission from the wireless network.

4. The method of claim 1, wherein the data contains an identity of the apparatus.

5. The method of claim 4, wherein the transmitting of the data comprises transmitting the data on resources that are shared with a physical uplink shared channel (PUSCH) that is for a different purpose.

6. The method of claim 5, wherein the transmitting of the data on the resources that are shared with the PUSCH comprises multiplexing the data and the PUSCH in a code domain by different preambles, and wherein the data and the PUSCH share same resources in either or both time and frequency.

7. The method of claim 6, wherein the transmitting of the data on the resources that are shared with the PUSCH further comprises prioritizing the data and the PUSCH by performing at least one of:
   assigning different starting positions for the data and the PUSCH;
   assigning different channel access priority levels to the data and the PUSCH; and
   assigning different LBT durations for the data and the PUSCH.

8. The method of claim 1, further comprising:
   transmitting, by the processor, in a physical uplink control channel (PUCCH) in the NR-U to the wireless network on a contention-based or contention-free basis when a communication channel between the apparatus and the wireless network is clear for transmissions.

9. The method of claim 8, wherein the transmitting in the PUCCH comprises either:
   transmitting in the PUCCH a scheduling request (SR), an acknowledgement (ACK), a negative acknowledgement (NACK), or a combination thereof; or
   transmitting in the PUCCH on configured resources that are defined according to a rule,
   wherein the rule is predefined in a specification or received in a broadcast signal or signaling specific for the apparatus from the wireless network.

10. The method of claim 9, wherein the rule involves either:
    transmitting in the PUCCH immediately following an originally scheduled resource; or
    allocating the configured resources at end of a slot, a mini-slot, or a channel occupancy time (COT).

11. The method of claim 8, wherein the transmitting in the PUCCH on the configured resources comprises determining whether the configured resources are available for autonomous transmissions by either:
    receiving an indication from the wireless network before the transmitting in the PUCCH; or
    performing LBT.

12. The method of claim 1, further comprising:
    transmitting, by the processor, in two physical channels or signals for different purposes in the NR-U that share same resources in time or frequency.

13. The method of claim 12, wherein the transmitting in the two physical channels or signals comprises multiplexing the two physical channels or signals in a code domain by different preambles.

14. The method of claim 13, wherein the transmitting in the two physical channels or signals further comprises prioritizing the two physical channels or signals by performing at least one of:
    assigning different starting positions for the two physical channels or signals;
    assigning different channel access priority levels to the two physical channels or signals; and
    assigning different LBT durations for the two physical channels or signals.

15. The method of claim 1, wherein the RACH resources comprise pre-configured RACH resources allocated after a short inter-frame space (SIFS) following each of the SS burst sets to relax uplink LBT for PRACH transmission, and wherein:
    for single-beam transmissions, the RACH resources are allocated in ending symbols of a slot for synchronization signal block (SSB) or physical broadcast channel (PBCH),
    for multi-beam transmissions, the RACH resources are allocated either in a same slot as a corresponding SSB or in a fixed duration after each of the SS burst sets.

16. The method of claim 1, wherein the receiving from the base station which transmits one or multiple SS/PBCH blocks comprises allocating opportunistic SS/PBCH block transmission opportunities responsive to pre-configured periodic SS/PBCH block transmission opportunities being not available due to failure of LBT.

17. A method, comprising:
    receiving, by a processor of an apparatus, from a base station of a wireless network one or multiple burst sets of synchronization signal and physical broadcast channel (PBCH) blocks (SS/PBCH blocks) whose indices are indicated in a cyclic-wrapped order subject to a result of listen-before-talk (LBT) in a New Radio unlicensed spectrum (NR-U);
    transmitting, by the processor, a random access request on random access channel (RACH) resources allocated by the base station;
    performing, by the processor, LBT in the NR-U for transmission of a RACH preamble (Msg1) on a physical random access channel (PRACH); and
    performing, by the processor, multiple PRACH transmissions of the Msg1, which are not retransmissions, to the wireless network on multiple of the allocated RACH resources before end of a random access response (RAR) window of time; and
    transmitting, by the processor, in two physical channels or signals for different purposes in the NR-U that share same resources in time or frequency,
    wherein the transmitting in the two physical channels or signals comprises multiplexing the two physical channels or signals in a code domain by different preambles by performing some or all of:
        assigning different starting positions for the two physical channels or signals;
        assigning different channel access priority levels to the two physical channels or signals; and
        assigning different LBT durations for the two physical channels or signals.

* * * * *